March 28, 1967 — R. H. TAYLOR — 3,311,348
CHAIN JACK TENSIONING DEVICE
Filed Sept. 23, 1965
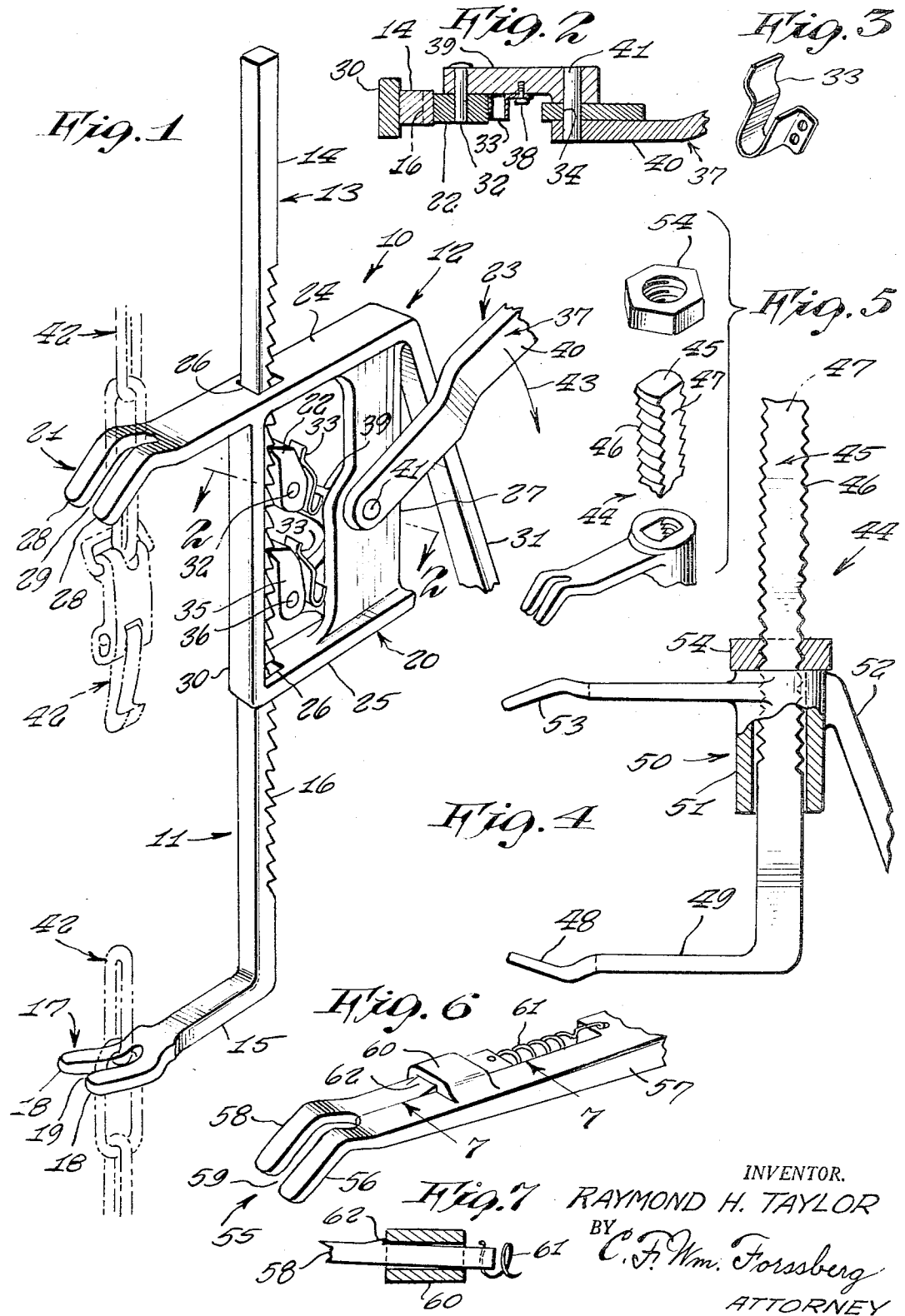
INVENTOR.
RAYMOND H. TAYLOR
BY C. F. Wm. Forssberg
ATTORNEY

United States Patent Office 3,311,348
Patented Mar. 28, 1967

3,311,348
CHAIN JACK TENSIONING DEVICE
Raymond H. Taylor, Bishop, Calif.
(P.O. Box 122, Big Pine, Calif. 93513)
Filed Sept. 23, 1965, Ser. No. 489,555
1 Claim. (Cl. 254—74)

This invention relates generally to tire chain tensioning devices for automotive vehicles.

It is generally well known to those skilled in the art that the application of a non-skid chain around an automotive tire is not easy. The fender and automobile body confine the access around the tire and it is usually difficult to sufficiently draw together the chain ends for connecting them.

Accordingly it is a principal object of the present invention to provide a tensioning device designed particularly for drawing together the ends of a non-skid chain sufficiently so that the ends may be connected together.

Another object is to provide a tire chain tensioning device which incorporates a jack principal of a ratchet and pawl mechanism for intermittently moving and securing a slidable member relative to a stationary member and wherein the mechanism is arranged to draw hook elements on each member toward each other.

Another object is to provide a chain jack tensioning device which will decrease the need of placing the hands into the dangerous areas around the wheel during take up of the chain.

Yet another object is to provide a chain jack tensioning device having self contained means to automatically release itself from the chain after completing its tensioning service.

Other objects are to provide a chain jack tensioning device that is simple in design, inexpensive to manufacture, rugged in construction, easy to use and efficient in operation.

These and other objects will be readily evident upon a study of the following specification and the accompanying drawing wherein:

FIGURE 1 is a perspective view of the invention shown in operative use,

FIGURE 2 is a cross sectional view taken on line 2—2 of FIGURE 1,

FIGURE 3 is a perspective view of a leaf spring used in the present mechanism,

FIGURE 4 is a fragmentary side elevation view partly in cross section of a modified form of the invention, FIGURE 5 is a fragmentary exploded view of elements incorporated in the structure shown in FIGURE 4, FIGURE 6 is a fragmentary perspective view of a modified form of claw construction, and FIGURE 7 is a cross sectional view through line 7—7 of FIGURE 6.

Referring now to the drawing in detail, the numeral 10 represents a chain jack tensioning device according to the present invention wherein there is a stationary member 11 upon which there is slidable member 12.

The stationary member comprises an L-shaped bar 13 having a long leg 14 and short leg 15 at right angle to each other. The bar is made preferably of square stock and the leg 14 has a ratchet 16 along one side thereof. A claw 17 comprised of tines 18 having a slot 19 therebetween is at the end of leg 15.

The slidable member includes a frame 20 carrying a claw 21, pawl 22, and lever unit 23.

The frame includes paralleled beams 24 and 25 having openings 26 to receive the leg 14 therethrough, a connecting web 27 therebetween, claw 21 at the end of beam 24 (the claw having tines 28 with slot 29 therebetween), a connecting beam 30 and angular arm 31.

Pawl 22 is mounted rotably free on a pin 32 secured to the frame, and a leaf spring 33 also secured to the frame normally urges the pawl into engagement with the ratchet.

The lever unit is mounted pivotally free in a bearing 34 in the frame web. A second pawl 35 mounted pivotally free on a pin 36 secured to one end of lever 37 is urged into normal engagement with the ratchet by a second leaf spring 33 secured to the lever 37 by screws 38. It is to be noted as shown in FIGURES 1 and 2 that lever 37 may be made of two bars 39 and 40 one of which is on each side of web 27, the bars being stationarily fixed together by a rod 41 supported in web bearing 38.

In operative use one end of tire chain 42 is secured in claw 17 and the other end is claw 21. By pivoting the lever 37 about its rod 41 into the direction indicated by arrow 43 the slidable member advances toward the stationary claw due to pawl 22 being engaged with the ratchet. On return movement of the lever the frame does not return due to pawl 35 engaged with the ratchet. Thus the claws are brought together to allow connection of the chain ends.

In a modified construction shown in FIGURES 4 and 5 the device 44 includes a stationary member 45 having screw thread 46 on leg 47 and a claw 48 on leg 49. A slidable member 50 has a sleeve 51, handle 52 and claw 53 integrally affixed. A nut 54 on thread 46 normally urges the claws together by simply turning the nut which bears against member 50.

In a further modified construction, the stationary member and slidable member may have a claw 55 comprised of a stationary tine 56 on the end of arm 57 and a slidable tine 58 having a slot 59 therebetween. The arm has a sleeve 60 in which tine 58 slides. The tine 58 is normally urged into retracting position by a tension coil spring 61 secured between the tine 58 and arm. A spur 62 on tine 58 normally prevents retraction due to loose fit of the tine in the sleeve thereby allowing tilt thereof and cause the spur to rest against the sleeve 60 as shown in FIGURE 7. In use, after tensioning the tire chain the tool is readily removed by slightly loosing the tension on the tire chain. This causes the tine 58 (formerly angled due to the tire chain load) to now straighten its position and allow the spur to pass through the sleeve 60; the tine 58 being on the side closest to the tire is thus retracted allowing directly forward tool removal.

While various changes may be made in the detail construction it is understood that such changes will be in the spirit and scope of the present invention as is defined by the appended claim.

I claim:

In a chain jack tensioning device, the combination of a stationary member, a slidable member on said stationary member, a claw on each of said members, and means for drawing said claws toward each other, said means comprising a ratchet on said stationary member, and a pair of pawls on said slidable member in engagement with said ratchet, said slidable member comprising a frame supporting said claw, one of said pawls and a lever unit having said other pawl, both said pawls being spring urged against said ratchet, said claws each comprising a stationary tine on said frame and a spring urged slidably retractable tine, a sleeve on said frame having an oversized opening, said slidable tine extending through said opening, a spur on said slidable tine, said spur abutting an edge of said sleeve when said tines are tilted relative to each other, and said spur passing through said sleeve when said tines are positioned in a straight line relative to each other.

References Cited by the Examiner

UNITED STATES PATENTS

| | | | |
|---|---|---|---|
| 1,036,093 | 8/1912 | Gatten et al. | 254—72 X |
| 1,206,776 | 11/1916 | Fraser | 254—72 |
| 1,451,410 | 4/1923 | Trinkel | 254—74 |
| 1,466,977 | 9/1923 | Tremayne | 254—71 |
| 1,710,092 | 4/1929 | Hitchcock | 254—67 |

FOREIGN PATENTS

| | | |
|---|---|---|
| 127,892 | 4/1932 | Austria. |
| 92,624 | 6/1938 | Sweden. |

WILLIAM FELDMAN, *Primary Examiner.*

MILTON S. MEHR, *Examiner.*